Figure 1:
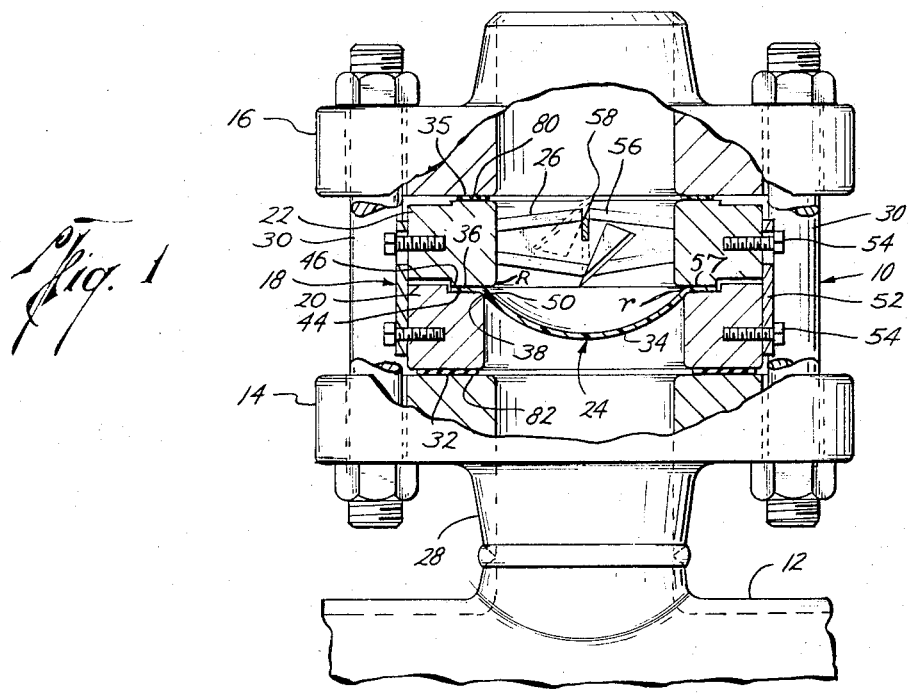

Dec. 27, 1966   L. E. WOOD   3,294,277
SAFETY DEVICE FOR PRESSURE VESSELS
Filed Oct. 26, 1964   3 Sheets-Sheet 1

Loren E. Wood
INVENTOR.

BY
ATTORNEYS

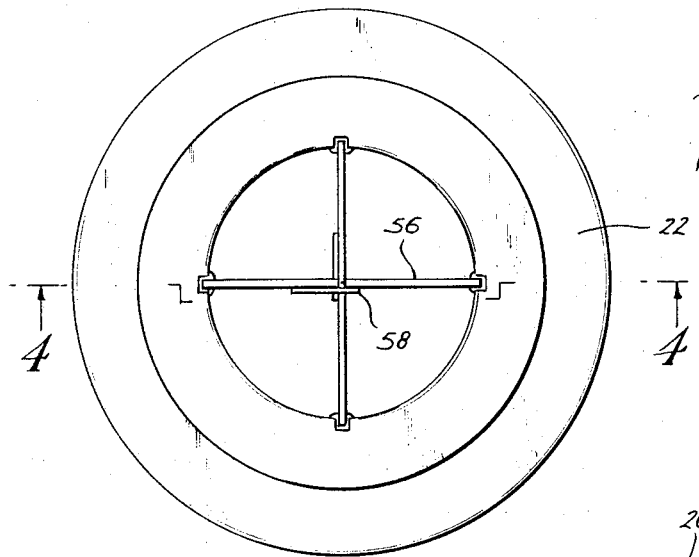
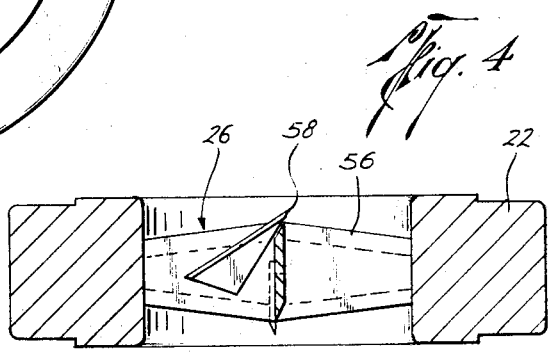
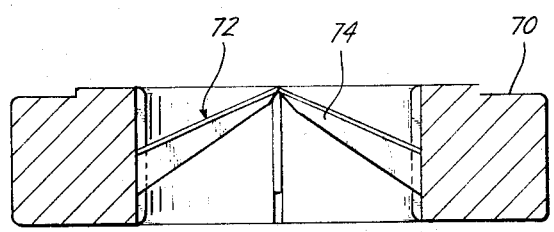
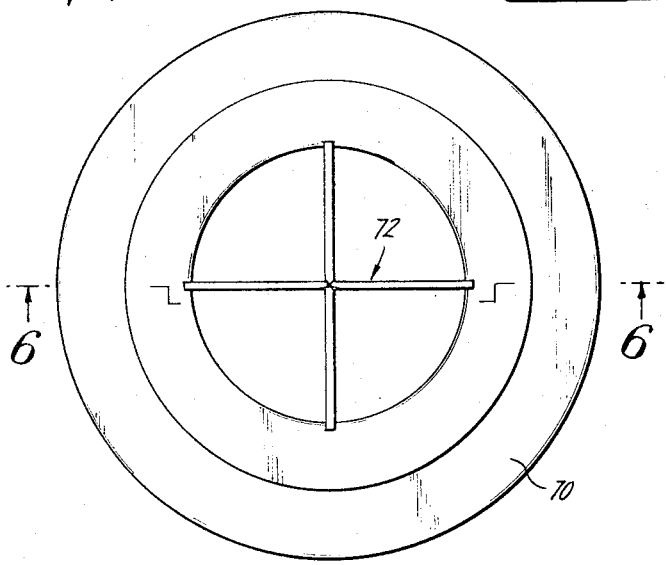

Dec. 27, 1966  L. E. WOOD  3,294,277
SAFETY DEVICE FOR PRESSURE VESSELS
Filed Oct. 26, 1964  3 Sheets-Sheet 3
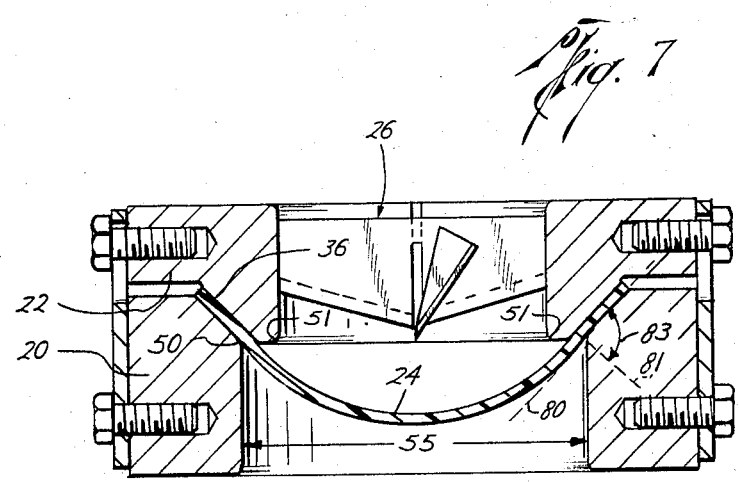
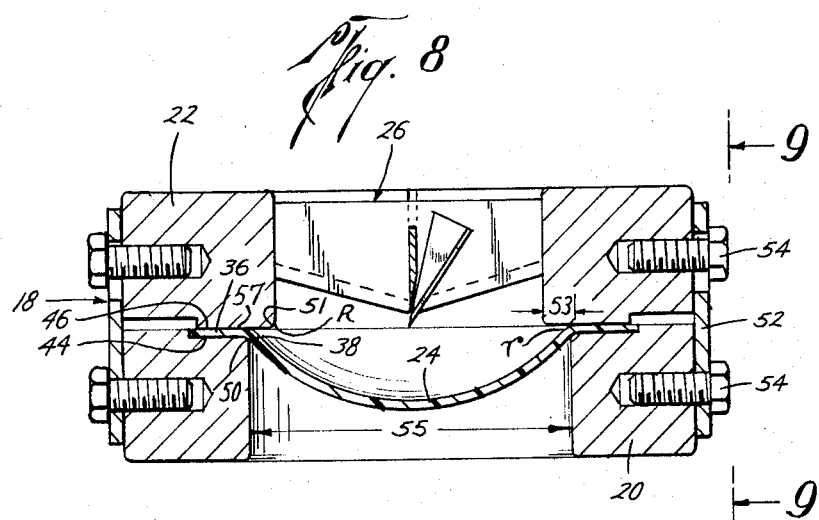
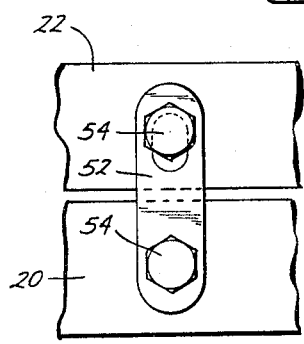
Loren E. Wood
INVENTORS

United States Patent Office 3,294,277
Patented Dec. 27, 1966

3,294,277
SAFETY DEVICE FOR PRESSURE VESSELS
Loren E. Wood, Houston, Tex., assignor to Black, Sivalls & Bryson, Inc., Kansas City, Mo., a corporation of Delaware
Filed Oct. 26, 1964, Ser. No. 406,470
8 Claims. (Cl. 220—89)

The present invention relates to an improved safety device for pressure vessels, and more particularly, relates to an improved safety device utilizing a reverse buckling disc.

The idea of having a ruptured disc that would operate successively at 90% or more of its rated burst pressure has been the objective of the industry for many years. However, due to creep and fatigue of metals the conventional rupture discs have not been successfully operated for any prolonged period of time. A reverse buckling disc with the convex side facing the pressure vessel has previously been proposed in the patent to Huff, No. 2,225,220. However, it has been found that critical dimensions, shapes and tolerances are required to cause failure of the disc to occur by buckling or elastic instability which are not shown by the prior art. Thus, a reverse buckling disc with proper limitations has the advantage that the stresses on the disc will be much lower so that fatigue and creep problems can be minimized. And since elastic buckling depends mainly upon the elastic modulus of the material, a quantity that is relatively unchanged by minor variations in structure, composition and temperature, the material reproduceability would be less of a critical problem.

Therefore, it is the general object of the present invention to provide a reverse buckling disc.

A still further object of the present invention is the provision of a concave-convex reverse buckling disc having an improved seat configuration and connection to supporting members to provide a safety device which will operate at 90% of the rated rupture pressure.

Yet a further object of the present invention is the provision of a reverse buckling disc having a flange connected to a concave-convex disc by a transition connection whereby the disc will fail by elastic instability and not due to creep, fatigue or stress so that it will operate at a high percent of its rated buckling pressure.

A still further object of the present invention is the provision of a reverse buckling disc having a flange connected to a concave-convex disc by a transition connection and held between two supporting members in which the outlet supporting member has a back up supporting shoulder which is positioned inwardly further than the transition connection for support of the disc.

Yet a further object of the present invention is the provision of a reverse buckling disc having an annular flange connected to a concave-convex portion of the disc by a small radius connection and is held by a pair of annular supporting members, the inlet supporting member having an interior small radius corner coacting with the small radius connection of the disc for support of the disc during reverse pressure.

A still further object of the present invention is the provision of a concave-convex reverse buckling disc held by a pair of annular supporting members with the disc having an annular flange connected by a small radius connection $r$ to the concave-convex portion of the disc, the outlet supporting member having a back up supporting shoulder with an interior corner having a radius $R$, and the interior edge of the radius $r$ being positioned inwardly from the inner edge of the annular flange by a distance at least as great as $r$ plus $R$.

Yet a further object of the present invention is the provision of a concave-convex reverse buckling disc having an annular flange connected by a small radius $r$ to the concave-convex portion of the disc and held by a pair of supporting members wherein the ratio of the radius $r$ to the thickness of the disc is no more than 40, and is preferably in the order of one to eight particularly when the ratio of rupture pressure in p.s.i. multiplied by the interior diameter in inches of the inlet supporting member is less than 500.

A still further object of the present invention is the provision of a concave-convex reverse buckling disc held by a pair of supporting members and a cutting edge positioned on the concave side of the disc wherein the leading point of the cutting edge is located and approximately on line with the mating plane of the supporting members.

Yet a further object of the present invention is the provision of a concave-convex reverse buckling disc held by a pair of supporting members wherein the disc includes an annular flange connected to the concave-convex portion by a small radial connection and wherein the annular flange is positioned in a sector bounded on one side by a tangent line to the outside of the convex side of the disc at the point of support and a line ninety degrees therefrom on the convex side of the disc.

Still a further object of the present invention is the provision of a reverse buckling disc having an annular flange connected to the concave-convex portion of the disc by a small radius connection and which is held in position by a set of supporting members, one of which has an annular recess for receiving the annular flange and the other of which has a ridge to coact with the annular recess to securely hold the buckling disc in position.

A still further object of the present invention is the improvement in the structure for holding a reverse buckling spherical sector disc which has a flat flange and a small radius connection of that flange to the concave-convex portion of the disc of a pair of clamping rings, one of which includes an annular recess for receiving the annular disc flange and the other of which includes an annular shoulder coacting with the recess to securely hold and support the annular flange and in which the inlet side clamping ring includes a small radius corner coacting with the radius connection of the disc and includes restraining means connected between the two clamping rings for securely aligning the clamping rings with the disc.

Yet a further object of the present invention is the provision of a reverse buckling safety device for low pressure vessels wherein a buckling disc is secured to the vessel by a pair of clamping rings and which the outlet clamping ring includes shearing elements positioned within the outlet ring to open the disc once it has buckled and preferably in which shearing elements are directed in both directions whereby the outlet clamping ring may be reversed when the cutting elements on one side become dulled.

Figure 2:
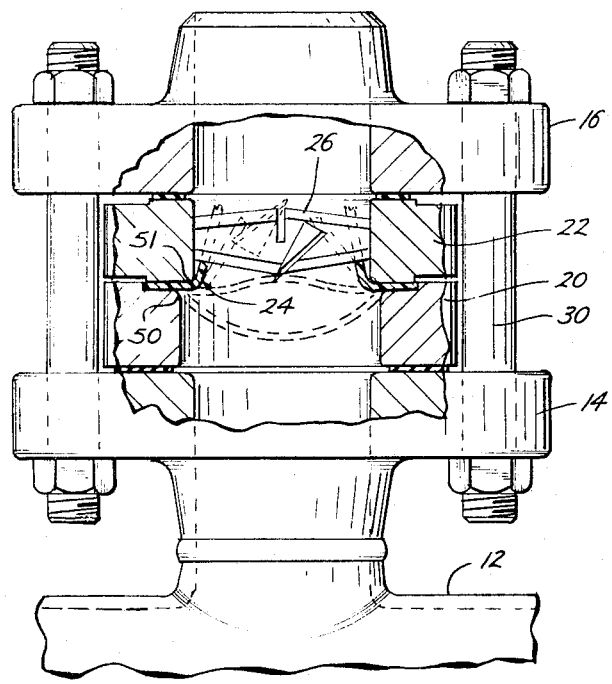

Other and further objects, features and advantages will be apparent from the following description of presently preferred embodiments of the invention, given for the purpose of disclosure, and taken in conjunction with the accompanying drawings, where like character references designate like parts throughout the several views, and where, FIGURE 1 is an elevational view, partly in cross section, of a reverse buckling safety device of the present invention connected to a pressure vessel, FIGURE 2 is an elevational view, partly in cross section, of the apparatus of FIGURE 1, illustrating the buckling and shearing of the disc at rupture pressure.

FIGURE 3 is a plan view of the outlet clamping ring illustrating a shearing blade configuration which is reversible and adapted for installation in either direction, FIGURE 4 is a cross-sectional view taken along the line 4—4 of FIGURE 3, FIGURE 5 is a plan view of one side of another outlet clamping ring illustrating a plurality of knife blades converging at the axis adapted for cutting a thinner type of reverse buckling disc, FIGURE 6 is a cross-sectional view taken along the line 6—6 of FIGURE 5, FIGURE 7 is an enlarged cross-sectional view showing a modified supporting configuration for the disc of the present invention, FIGURE 8 is an enlarged cross-sectional view showing the clamping rings holding the disc of the present invention and being aligned and secured together, and FIGURE 9 is a fragmentary cross-sectional view taken along the line 9—9 of FIGURE 8.

Referring now to the drawings, and particularly to FIGURE 1, the numeral 10 generally designates the safety device of the present invention for use on a pressure vessel 12 for protecting the vessel and preventing the vessel from being subjected to an excess pressure. The safety device 10 generally includes a pair of supporting members supporting a safety disc 24. The supporting members may include pipe flanges 14 and 16 and a subassembly 18. The subassembly 18 may include a pair of clamping rings 20 and 22 which hold the reverse buckling disc 24 and a shearing assembly 26 for opening the disc 24 when it buckles under excess pressure.

The pipe flange 14 is provided with a neck 28 which may be secured to the pressure vessel 12 such as by means of welding. Each of the pipe flanges 14 and 16 may include a plurality of openings so that the pipe flanges 14 and 16 may be securely fastened together, such as by bolts 30 for aligning and securing the subassembly 18 in a correctly aligned position so that the reverse buckling disc 24 will be exposed to the pressure in the vessel 12. Each of the pipe flanges 14 and 16 are provided with a flat surface 32 and 35, respectively, perpendicular to the flow through the apparatus 10 to properly align and sealingly receive the subassembly 18.

The reverse buckling disc 24 can be of various shapes and preferably consists of a spherical sector portion 34 with the convex portion being subjected to and yieldably responsive to pressure in the vessel 12. It is called a reverse buckling disc as the pressure is exposed to the convex side instead of the concave side and is particularly useful at low pressures although not limited thereto. For example, using a certain material of .001 inch thickness in a one inch disc, failure from the concave side would be no less than 200 p.s.i.g. Yet using the same disc, and a cutting edge the failure from the convex side would be about 15 p.s.i. The disc 24 also includes an annular flange, preferably flat, which is connected to the spherical portion 34 by a transition connection, preferably a small radius connection 38. The disc 24 is formed of sheet material of a tensile strength proportional to the diameter and thickness so that it is self supporting under normal pressures but will yield when pressures exerted on the convex side exceed those for which it was designed.

The clamping rings 20 and 22 are arranged to be clamped and held in position by the pipe flanges 14 and 16 and in turn support, align, and hold the buckling disc 24. It is necessary that the seating surfaces on the clamping rings have the proper shapes and dimensions to coact with the disc. When the disc 24 is subjected to reverse pressure the inlet clamping ring 20 may include an interior corner 50 which may have a small radius substantially equal to the radius of the radial connection 38 on the disc 24 so as to coact and support the radial connection 38 in the reverse direction. It is also noted that the annular flange 36 of the buckling disc is securely held along its entire circumference on both of its sides to prevent it from being subjected to any failure. And as more clearly seen in the enlarged FIGURE 8 the outlet clamping ring 22 includes a back up shoulder 57 which backs up and supports the disc 24. The shoulder 57 may further include an interior corner 51, which is preferably rounded having a radius R for preventing cutting the disc 24 so disc parts are not blown downstream. The radius R should be at least twice the thickness of the disc 24.

It is important that the shoulder 57 be positioned inwardly as compared to the inner edge of the flange 36 to provide complete support of the transition connection or radial connection 38 of the disc 24 during the process of the failure of the disc 24. This insures that the buckling disc 24 will fail by elastic instability instead of stress or fatigue. That is, the back up shoulder 57 must support the radial connection 38 and prevent it from rolling through thus causing premature failure by stress or fatigue. The distance 53 at which shoulder 57 and interior corner 51 is positioned further inwardly or toward the axis of the disc 24 than the inner edge of annular flange 36 is at least as great as $r+R$.

Furthermore, it has been determined that if the ratio of rupture pressure of the disc 24 in p.s.i. is multiplied by the internal diameter 55 in inches of the clamping ring 20 is less than 500, the radius $r$ of the connection 38 is more critical than when the ratio ranges upwardly to a present maximum of 6000. Where "$t$" is the thickness of the rupture disc 24, it is desirable that the ratio $r/t$ be no greater than 40, but the optimum ratio is in the range of 1 to 8 especially so when the ratio of rupture pressure multiplied by the interior diameter 55 of the clamping ring 20 is 500 or less and when the ratio of $r/t$ is greater than eight, it is necessary that the supporting shoulder 57 and the inner edge of corner 51 (distance 53 in FIGURE 8) be greater than $3r+R$ to adequately support the transition connection 38 from rolling through.

Preferably one of the clamping rings, such as 20, includes an annular recess 44 for receiving the flange 36 and centering the buckling disc 24. The second or outlet clamping ring 22 may have an annular ridge 46 coacting with the recess 44 to securely grip and hold the flange 36 and seal about the flange 36 when the subassembly 18 is clamped into place by the holding members 14 and 16.

Referring to FIGURES 1, 2, and 8, the annular ring 36 is shown in a plane normal to the axis of the clamping rings 20 and 22. That is, the flange 36 is perpendicular to the axis of the safety disc 24. However, and referring now to FIGURE 7, the annular flange 36 can be at an angle to the axis of the disc 24, but there is a maximum angle after which the resolution of forces on disc 24 no longer produces a resultant supporting force during failure on shoulder 57. That is, the flange 36 must fall within a ninety degree sector bounded on one side by the tangent line 80 to the disc 24 at its point of support by the clamping rings and a line 81 perpendicular thereto on the convex side. Therefore, the flange 36 must fall with its sector as indicated by the angle 83.

It is desirable that the reverse buckling disc 24 be properly aligned in the clamping rings 20 and 22 in order that the annular flange 36 be securely clamped so that the radial shoulder 50 of the clamping ring 20 can coact with the radial connection 38 on the disc 24. Therefore, referring to FIGURES 1, 8 and 9 retaining means such as plates 52 and bolts 54 may be provided to align and secure the disc 24 and the subassembly 18 together before it is placed between the holding members 14 and 16 thereby securely aligning the disc 24 in its proper position relative to the clamping rings 20 and 22.

However, in order to relieve any pressures in the vessel 12 when they exceed those for which the vessel or system was designed and the buckling disc 24 buckles, a shearing assembly 26 is provided on the concave side of the disc 24 to penetrate, shear, and open the disc so as to relieve the pressure in the vessel 12. The assembly 26 shown in FIGURE 1 is equipped with a plurality of blades 56 and a safety point 58 in both directions for increasing blade life. That is, when the blades and safety point on one side become dull, the assembly, which may be securely fastened to the outlet flange 22 may be reversed and a new and sharper blade is provided. This reversal type of assembly is used for various material thicknesses and ruptures at higher designed pressures.

The outlet clamping ring 70 and cutting assembly 72, as best seen in FIGURES 5 and 6, illustrate a plurality of cutting blades 74 converging at the axis and is defined for use with thinner buckling discs for rupturing at lower pressures. However, the axial location of the shearing assembly in both the configuration shown in FIGURES 1–4 and that of FIGURES 5 and 6 is important. The proper location is that the leading edge of the shearing or cutting essembly is near the plane passing through the mating faces of the clamping rings 20 and 22. The blades or knives must be far enough away from the concave side of the disc 24 when it is in its normal position so that when the disc fails it will gain sufficient momentum to carry through and be forcibly impaled on the cutting edges.

In use, a reverse buckling disc 24 is first assembled in the subassembly 18 as best seen in FIGURE 8 by insertion of the annular flange 36 into the recess 44 of clamping ring 20 and the outlet clamping ring 22 is placed thereon with the annular ridge 46 coacting with the recess 44 to secure the entire circumference of the annular flange 36. Then the clamping plate 52 and bolts 54 may be positioned to securely align the clamping rings 20 and 22 in position supporting and holding the buckling disc 24. The subassembly 18 is then ready for insertion between the holding members 14 and 16 between seals 80 and 82 after which the bolts 30 are placed in position and tightened thereby placing the convex portion of the buckling disc 24 in communication with the fluid pressure in the vessel 12.

Because of the manner of support of the annular flange 36 with the small radial connection 38 and the back up support of the shoulder 57, the reverse buckling disc 24 has been found to successfully operate at 90% of its rated pressure without buckling as this holding structure will avoid the fatigue and creep problems and any failure will occur by elastic instability which is a relatively stable property based upon the elastic modulus of the material when the pressure in the vessel exceeds a predetermined amount. Referring now to FIGURE 2, when this pressure exceeds the amount for which the vessel was designed, the reverse buckling disc 24 buckles and is impaled on the shearing assembly 26 where it is punctured, sheared and opened to relieve the pressure in the vessel 12.

The present invention, therefore, is well adapted to carry out the objects and attain the ends and advantages mentioned as well as others inherent therein. While presently-preferred embodiments of the invention are given for the purpose of disclosure, numerous changes in the details of construction, arrangement of parts can be made which will readily suggest themselves to those skilled in the art and which are encompassed within the spirit of the invention and the scope of the appended claims:

What is claimed is:
1. In a safety device for a pressure vessel having a concave-convex disc supported between inlet and outlet supporting members with the convex portion subjected to the pressure of the vessel, the improvement comprising,
said disc having an annular flat flange connected to the concave-convex section by a small radial transitional connection having radius $r$,
each of said supporting members including flat portions to coact with and support the flat flange, the inlet supporting member terminating inwardly in the same plane as its flat portion with a rounded shoulder coacting to support the radial transitional connection during reverse pressure, the flat portion of the outlet supporting member terminating inwardly in the same plane as its flat portion with a rounded shoulder having a radius $R$ the interior of the shoulder $R$ being positioned inwardly further than the rounded shoulder on the inlet member by a distance at least as great as $R$ thereby providing a back up shoulder against and supporting the transitional connection.

2. The apparatus of claim 1 wherein the ratio of the radius $r$ of the transitional connection to the thickness of the disc is less than forty.

3. The apparatus of claim 1 wherein the $t$ is the thickness of the disc and the ratio of the rupture pressure of the disc is p.s.i. multiplied by the interior diameter of the disc in inches is less than 500, and the ratio $r/t$ is in the range of 1 to 8.

4. The apparatus of claim 1 wherein the radius $R$ is at least twice the thickness of the disc.

5. In a safety device for a pressure vessel having a concave-convex disc supported by two holding members with the convex portion of the disc subjected to the pressure in the vessel, the improvement comprising,
said disc having a flat annular flange connected to the concave-convex portion of the disc by a small radius $r$ connection,
an inlet clamping ring having an annular flat recess for receiving said annular flange for centering said disc,
an outlet clamping ring having an annular flat ridge coacting with the annular recess of the inlet clamping ring to grip and hold the annular flange of the disc,
the inlet clamping ring terminating inwardly in a plane with the recess with a rounded shoulder coacting with the radius $r$ for providing support during reverse pressure, and
the flat portion of the outlet clamping ring terminating inwardly in a plane with the ridge with a rounded shoulder having a radius $R$ which is positioned inwardly further than the rounded shoulder on the inlet ring by a distance at least as great as $R$ thereby providing a backup shoulder against and supporting the transitional connection.

6. In a safety disc for a pressure vessel having a concave-convex disc supported between inlet and outlet supporting members with the convex portion subjected to the pressure of the vessel, the improvement comprising.
said disc having an annular flat flange connected to the concave-convex section by a small radial transitional connection having a radius $r$,
the ratio of the small radius connection $r$ to the thickness of the disc being no greater than 40,
each of said supporting members including flat portions to coact with and support the flat flange, the inlet supporting member terminating inwardly in the same plane as its flat portion with a rounded shoulder coacting to support the radial transitional connection during reverse pressure, the flat portion of the outlet supporting member terminating inwardly in the same plane as its flat portion with a rounded shoulder having a radius $R$, the interior of the shoulder $R$ being positioned inwardly further than the rounded shoulder on the inlet member by a distance at least as great as $3r$ plus $R$ thereby providing a backup shoulder against and supporting the transitional connection.

7. A safety device for a pressure vessel comprising,
an annular inlet and outlet supporting member for connection to the pressure vessel,
a concave-convex buckling disc clamped between the supporting members and positioned with the convex portion subjected to the pressure in the vessel,
said disc having a flat annular flange connected to the concave-convex portion by a small radial connection $r$,
the ratio of the radius $R$ to the thickness of the disc being greater than two,
the ratio of the radius $r$ to the thickness of the disc being less than forty,
each of said supporting members including flat portions to coact with and support the flat flange, the inlet supporting member terminating inwardly in the same plane as its flat portion with a rounded shoulder coacting to support the radial transitional connection during reverse pressure, the flat portion of the outlet supporting member terminating inwardly in the same plane as its flat portion with a rounded shoulder having a radius R, the interior of the shoulder R being positioned inwardly further than the rounded shoulder on the inlet member by a distance at least as great as $r+R$, and cutting means positioned on the concave side of the disc with the leading edge positioned approximately on the mating plane between the annular supporting member.

8. The apparatus of claim 7 wherein the cutting means is connected to the outlet supporting member and is directed axially in both directions whereby the outlet member may be reversed when the cutting means adjacent the disc becomes dull.

References Cited by the Examiner
UNITED STATES PATENTS

| | | | |
|---|---|---|---|
| 2,194,159 | 3/1940 | Bonyun et al. | 220—89 |
| 2,225,220 | 12/1940 | Huff | 220—89 |
| 2,263,840 | 11/1941 | Franck | 220—89 |
| 2,320,211 | 5/1943 | Bloom et al. | 220—89 |
| 2,440,462 | 4/1948 | Cooper | 220—89 |
| 2,661,121 | 12/1953 | Coffman et al. | 220—89 |
| 2,788,794 | 4/1957 | Holinger | 220—89 |
| 2,924,354 | 2/1960 | Hansen | 220—89 |

THERON E. CONDON, *Primary Examiner.*
RAPHAEL H. SCHWARTZ, *Examiner.*